United States Patent
Yamkovoy (10) Patent No.: US 10,110,987 B2
(45) Date of Patent: Oct. 23, 2018

(54) METHOD OF CONTROLLING AN ACOUSTIC NOISE REDUCTION AUDIO SYSTEM BY USER TAPS

(71) Applicant: Bose Corporation, Framingham, MA (US)

(72) Inventor: Paul Yamkovoy, Acton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/889,745

(22) Filed: Feb. 6, 2018

(65) Prior Publication Data

US 2018/0184196 A1     Jun. 28, 2018

Related U.S. Application Data (63) Continuation-in-part of application No. 15/668,386, filed on Aug. 3, 2017, now Pat. No. 9,930,440, which
(Continued)

(51) Int. Cl.
*H04R 3/00* (2006.01)
*H04R 1/10* (2006.01)
*G06F 3/0354* (2013.01)

(52) U.S. Cl.
CPC ....... *H04R 1/1083* (2013.01); *G06F 3/03547* (2013.01); *H04R 1/1016* (2013.01)

(58) Field of Classification Search
CPC ...... H04R 1/1041; H04R 1/1083; H04R 3/00; H04R 3/002; H04R 3/005; H04R 3/007;
(Continued)

(56) References Cited

U.S. PATENT DOCUMENTS 8,204,241 B2 * 6/2012 Asada .................. H04R 1/1041
                                                                   381/150
8,320,578 B2 * 11/2012 Kahn .................. H04M 1/6066
                                                                   381/123
(Continued)

FOREIGN PATENT DOCUMENTS

EP           2869594           5/2015
WO        2006075275        7/2006
(Continued)

OTHER PUBLICATIONS

International Search Report and Written Opinion in counterpart International Application No. PCT/US2016/063006, dated Feb. 13, 2017; 23 pages.
(Continued)

*Primary Examiner* — Thang Tran
(74) *Attorney, Agent, or Firm* — Schmeiser, Olsen & Watts LLP; William G. Guerin (57) ABSTRACT

Described are a headphone and a method for controlling an audio system. The method includes tapping a headphone or head of a user to cause an acoustic pressure change in an ear canal of the user wherein the ear canal is sealed by an acoustic noise reduction (ANR) headphone having an ANR module. A current provided to the ANR module is sensed. A peak value of the sensed current is determined and compared to a value of an adaptive threshold to determine if a tap occurred. If a tap is determined to have occurred, an updated value for the adaptive threshold is determined based on the peak value and at least on prior peak value. A mode of operation of the audio system or an attribute of an audio input signal may be changed in response to the determination of an occurrence of a tap.

15 Claims, 8 Drawing Sheets

Related U.S. Application Data is a continuation-in-part of application No. 14/973,892, filed on Dec. 18, 2015, now Pat. No. 9,743,170.

(58) Field of Classification Search
CPC ...... H04R 29/00; H04R 29/001; H04R 5/033; H04R 5/04; H04R 2420/03; G10K 11/002; G10K 2210/108; G10K 2210/1081; H04B 1/1661; H04H 40/72; G10L 21/02; G10L 21/0208; G10L 21/0216

See application file for complete search history.

(56) References Cited

U.S. PATENT DOCUMENTS

| | | | | |
|---|---|---|---|---|
| 8,477,955 B2* | 7/2013 | Engle | .................. | H04R 1/1041 |
| | | | | 381/71.1 |
| 8,634,565 B2* | 1/2014 | Asada | .................. | G06F 1/1626 |
| | | | | 381/122 |
| 8,687,816 B2* | 4/2014 | Shi | .................. | H04R 1/1041 |
| | | | | 381/56 |
| 9,042,571 B2* | 5/2015 | Dickins | .................. | H04R 1/083 |
| | | | | 345/177 |
| 9,053,709 B2* | 6/2015 | Chinen | .................. | G10L 25/00 |
| 9,743,170 B2 | 8/2017 | Yamkovoy | | |
| 2007/0025561 A1* | 2/2007 | Gauger, Jr. | .......... | H04R 1/1025 |
| | | | | 381/71.6 |
| 2007/0274530 A1* | 11/2007 | Buil | .................. | H04R 1/1041 |
| | | | | 381/74 |
| 2008/0260176 A1* | 10/2008 | Hollemans | .......... | H04R 1/1041 |
| | | | | 381/74 |
| 2009/0046868 A1* | 2/2009 | Engle | .................. | H04R 1/1041 |
| | | | | 381/74 |
| 2009/0169022 A1* | 7/2009 | Kost | .................. | H03F 1/523 |
| | | | | 381/56 |
| 2009/0296951 A1* | 12/2009 | De Haan | .................. | H04R 1/10 |
| | | | | 381/74 |
| 2010/0202626 A1* | 8/2010 | Shiori | .................. | H04R 1/1091 |
| | | | | 381/74 |
| 2011/0033073 A1* | 2/2011 | Inoshita | .................. | H04R 25/552 |
| | | | | 381/323 |
| 2011/0116643 A1* | 5/2011 | Tiscareno | ............ | H04R 1/1016 |
| | | | | 381/58 |
| 2011/0206215 A1 | 8/2011 | Bunk | | |
| 2011/0280415 A1 | 11/2011 | Gautama et al. | | |
| 2012/0112930 A1* | 5/2012 | Ivanov | .................. | G06F 3/01 |
| | | | | 341/20 |
| 2012/0148062 A1* | 6/2012 | Scarlett | .................. | G10K 11/178 |
| | | | | 381/71.6 |
| 2012/0328116 A1* | 12/2012 | Bidmead | .................. | H04R 29/004 |
| | | | | 381/59 |
| 2013/0051567 A1* | 2/2013 | Gipson | .................. | H04R 29/00 |
| | | | | 381/56 |
| 2013/0133431 A1* | 5/2013 | Manabe | .................. | G01H 11/06 |
| | | | | 73/649 |
| 2013/0311176 A1 | 11/2013 | Brown et al. | | |
| 2014/0270207 A1 | 9/2014 | Vinayak | | |
| 2015/0131814 A1* | 5/2015 | Usher | .................. | G06F 3/017 |
| | | | | 381/123 |
| 2016/0255448 A1* | 9/2016 | Morant | .................. | H04R 25/30 |
| | | | | 381/314 |
| 2016/0337744 A1* | 11/2016 | Kim | .................. | H04R 1/1091 |

FOREIGN PATENT DOCUMENTS

| | | |
|---|---|---|
| WO | 2012146922 | 11/2012 |
| WO | 2013020792 | 2/2013 |

OTHER PUBLICATIONS

*Ex Parte Quayle* Action in U.S. Appl. No. 14/973,892, dated Mar. 7, 2017; 11 pages.
Notice of Allowance in U.S. Appl. No. 14/973,892, dated May 4, 2017; 5 pages.
Non-Final Office Action in U.S. Appl. No. 15/668,386, dated Oct. 18, 2017; 8 pages.
Notice of Allowance in U.S. Appl. No. 15/668,386, dated Jan. 8, 2018; 5 pages.
International Preliminary Report on Patentability in PCT/US2016/063006 dated Jun. 28, 2018; 19 pages.

\* cited by examiner

METHOD OF CONTROLLING AN ACOUSTIC NOISE REDUCTION AUDIO SYSTEM BY USER TAPS

RELATED APPLICATION

This application is a continuation-in part application of U.S. application Ser. No. 15/668,386, filed Aug. 3, 2017 and titled "Acoustic Noise Reduction Audio System Having Tap Control," which is a continuation-in-part application of U.S. Pat. No. 9,743,170, issued on Aug. 22, 2017 and titled "Acoustic Noise Reduction Audio System Having Tap Control," the entireties of which are incorporated by reference herein.

BACKGROUND

This description relates generally to controlling the mode of an audio device and, more specifically, to acoustic noise reduction (ANR) headphones or headsets that can be controlled by the tap or touch of a user.

SUMMARY

In one aspect, a method for controlling an audio system includes tapping at least one of a headphone worn by a user and an ear or a head of the user to cause an acoustic pressure change in an ear canal of the user. The ear canal is substantially sealed by an ANR headphone having an ANR module. A current that is responsive to a pressure change in the ear canal and provided to the ANR module is sensed. A peak value is determined from the sensed current and compared to a value of an adaptive threshold to determine if a tap occurred. If the tap is determined to have occurred, an updated value for the adaptive threshold is determined based on the peak value and one or more prior peak values.

Examples may include one or more of the following features:

The method may further include changing at least one of a mode of operation of the audio system and an attribute of an audio input signal in response to a determination that the tap occurred.

The updated value of the adaptive threshold may be determined as a product of a predetermined constant and an average of the peak value and the one or more prior peak values. The value and the updated value of the adaptive threshold may be greater than an average noise level and less than an average of the peak value and the one or more prior peak values.

The one or more prior peak values may occur during a current user session or during a prior user session.

The sensing of the current provided to the ANR module may include sensing a voltage of the current sensor.

The updated value of the adaptive threshold may be greater than the value of the adaptive threshold if the peak value is greater than the value of the adaptive threshold. The updated value of the adaptive threshold may be less than the value of the adaptive threshold if the peak value is less than the value of the adaptive threshold.

The headphone may include an ear cup or an earbud.

In accordance with another aspect, a headphone includes a microphone, an ANR module and a processor. The microphone detects a pressure change in a substantially sealed cavity of the headphone wherein the cavity includes an ear canal of a wearer of the headphone. The ANR module is coupled to the microphone for generating a noise cancellation signal to cancel noise detected by the microphone. The processor is in communication with the microphone and the ANR module. The processor is configured to sense a current provided to the ANR module, wherein the current is responsive to a pressure change in the ear canal, and to determine a peak value from the sensed current. The processor is further configured to compare the peak value and a value of an adaptive threshold to determine if a tap occurred, and, if the tap is determined to have occurred, determine an updated value for the adaptive threshold based on the peak value and one or more prior peak values.

Examples may include one or more of the following features:

The processor may be further configured to change at least one of a mode of operation of the audio system and an attribute of an audio input signal in response to a determination that the tap occurred.

The determination of the updated value for the adaptive threshold may include determining a product of a predetermined constant and an average of the peak value and the one or more prior peak values.

The headphone may further include a current sensor in communication with the ANR module and the processor, and configured to provide a signal responsive to a characteristic of the current.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Various implementations described below allow a user to touch the outside of a headphone or headset, or to touch the ear or nearby head as a means to instruct the performance of a desired function. As used herein, an ANR headphone is any headphone or headset component that can be worn in or about the ear to deliver acoustic audio signals to the user or to protect the user's hearing, provides acoustic noise reduction or cancellation and has an exposed surface that can be tapped by a user. For example, an ANR headphone can be an ear cup that is worn on or over a user's ear, has a cushion portion that extends around the periphery of the opening to the ear as an acoustic seal, and a hard outer shell. ANR headphones, as used herein, also include ANR earbuds that are typically at least partially inserted into the ear canal and have an exposed surface that a user can tap or allow the user to tap the ear or a nearby region of the head.

Taps occurring in succession during a brief time period (e.g., fractions to several seconds) are defined herein as a "tap event." As used herein, a "tap sequence" refers to the content of the tap event, that is, the number of individual taps in the tap event. The tap sequence can be a single tap or can be two or more taps within a pre-determined period.

A tap event may be used to change a mode of operation of headphones or other components integrated with an ANR audio system. For example, the tap event can be used to change a headphone set from audio playback mode to a telephone communications mode. Alternatively, the tap event can be used to change a feature available in one mode that may not be available in a different mode. Thus the mapping of specific tap sequences to associated functions is defined according to the particular mode of operation of the ANR audio system. The tap event is interpreted in light of the current operating mode. For example, a tap sequence defined by a single tap during playback may be interpreted as an instruction to pause the current audio playback. In contrast, a single tap during telephone communications may be interpreted as an instruction to place a telephone call on hold. Other examples include tapping a headphone one or more times to change the volume of an audio signal during playback, to skip to a subsequent audio recording in a playlist or sequence of recordings, to pause audio playback and to pair the headphones with another device via wireless communication, for example, using Bluetooth. Advantageously, the detection of the tapping of the external portion of an ANR headphone, the ear or the head uses existing functionality within the ANR headphone. Moreover, the taps are reliably detected and can be used to control features available within a particular mode of operation of the headphones and to change to a different mode.

In an ANR headphone, noise is detected by a feedback microphone and ANR circuitry generates a compensating signal to cancel that noise. Conventional ANR circuitry does not distinguish between the various sources of pressure changes detected by the feedback microphone. The pressure change can be acoustic noise or can be the result of a touching of an exposed surface of the headphone, the external portion of the ear or a region of the head near to the headphone to cause an acoustic or subsonic pressure change. In response to the tap, the ANR circuitry generates a compensating signal.

In various examples, the visible portion of the ear made up of cartilage and skin, and which exists outside the head (i.e., the auricle or pinna), may be tapped to cause the pressure change in the sealed ear canal. Certain portions of the auricle, such as the helix, tragus, or antihelix, are more easily accessible to the user and can be tapped. As used herein, a tap or headphone tap includes a direct touching of a headphone or any intended touching of the ear or region of the head near the ear that causes a pressure change in the sealed ear canal. Tapping includes tugging, "flicking" or pulling of skin and/or cartilage of the ear or a portion of the head or skin on the head near the headphone. As used herein, a sealed ear canal includes a substantially sealed ear canal in which a complete seal does not exist. For example, there may be a small gap between the headphone and the ear can through which air may pass and thereby reduce the amplitude of the pressure change for a tap; however, the pressure change may be sufficient for recognizing the pressure change as a tap.

Examples of ANR headphones and ANR systems described herein take advantage of a difference between general acoustic noise and taps to a headphone based on a difference in the electrical current consumed by the ANR circuitry. More specifically, a power supply current detection circuit is used to distinguish current consumed as a result of acoustic noise from current consumed by a tap event. A tap event results in high pressure within the headphone, and generally draws more current from the power supply than that used to generate an acoustic noise cancelling signal. When the current detection circuit senses a characteristic of the current, such as an amplitude and/or waveform or duration, that corresponds to an occurrence of a tap event, a signal indicative of the tap sequence for the tap event is provided to a microcontroller for interpretation. For example, the microcontroller may be part of an audio and mode control module which initiates the changes to audio features and operating mode of the ANR system. The time occurring between consecutive taps in a single tap sequence can be defined to be less than a predefined duration or a tap sequence can require that all taps occur within a predefined time interval, for example, several seconds. Advantageously, the ability to tap a headphone to cause a change in mode or audio signal attribute avoids the use of control buttons to implement similar functions. Control buttons are often problematic for a user, especially when the buttons are located on a portion of the system that may be located in a pocket or on the arm of a user, or are located on a small or difficult to reach area of the headphone. For example, in the context of headsets used by pilots in aircraft, searching for buttons that are located on a peripheral or difficult to reach area may be distracting from focusing on the surroundings and the pilot's primary task.

Figure 1:
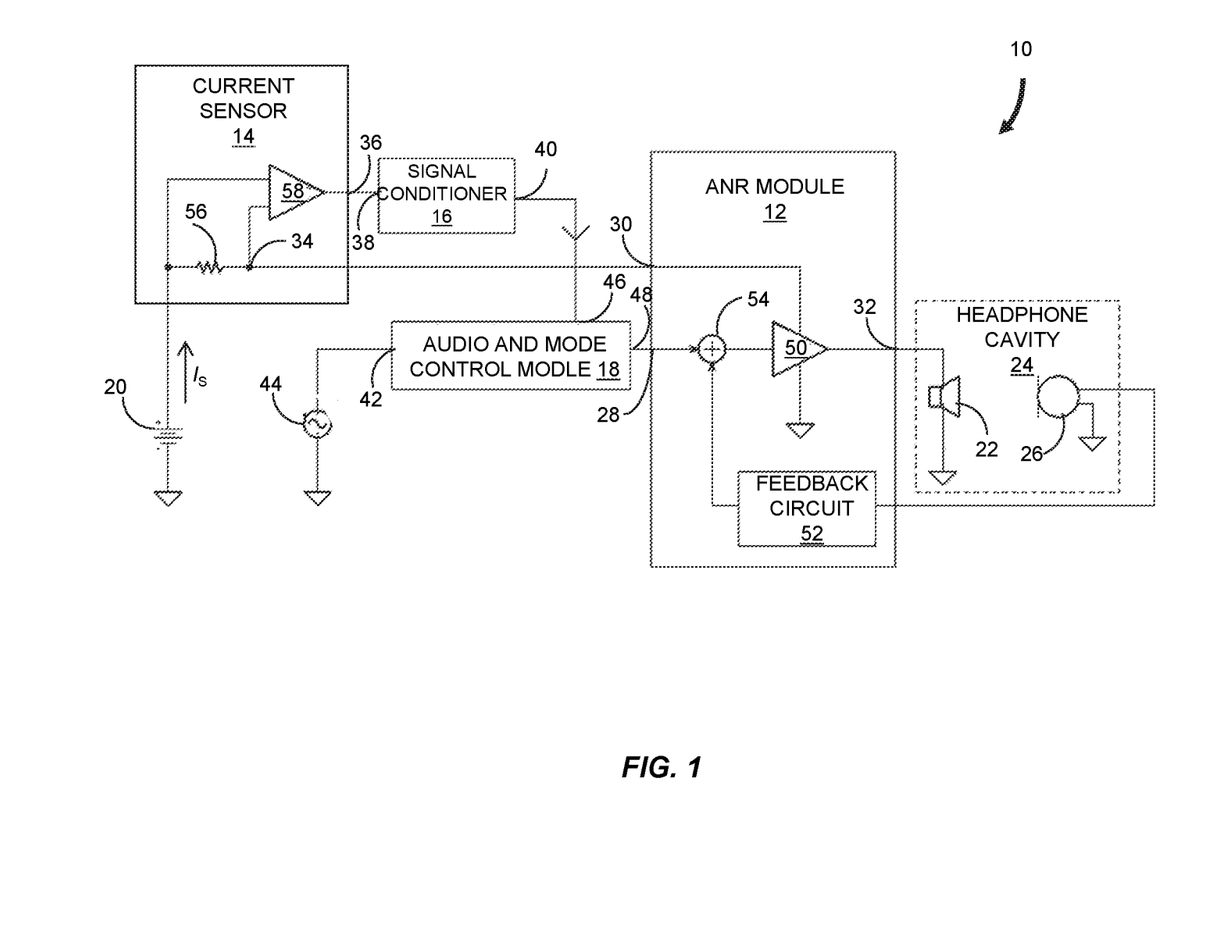
FIG. 1 is a functional block diagram of an example of a circuit for an ANR audio system having tap control.

FIG. 1 is a functional block diagram of an example of a circuit 10 for an ANR audio system having tap control. The circuit 10 includes an ANR module 12, a current sensor 14, a signal conditioner module 16, an audio and mode control module 18 and a power supply 20. The circuit 10 is configured to provide a signal to drive at least one acoustic driver ("speaker") 22 in a headphone cavity 24 and to receive a microphone signal from a microphone 26 in the headphone cavity 24. Although shown separately, it will be appreciated in light of the description below that certain elements of the signal conditioner module 16 and audio and mode control module 18 may be shared elements.

The ANR module 12 includes a first input 28 that receives an audio input signal from the audio and mode control module 18 and a second input 30 that receives a supply current $I_s$ from the power supply 20. By way of example, the power supply can be one or more batteries, DC power provided by the audio source, or may be an electrical power converter such as a device that uses alternating current (AC) power and provides direct current (DC) power at a desired voltage level. The ANR module 12 includes an ANR output 32 that provides an audio output signal to the speaker 22. In the illustrated circuit 10, the ANR module 12 also includes various other components including an amplifier 50, feedback circuitry 52 and a summing node 54 as are known in the art. Although shown as using feedback compensation, the ANR module 12 can additionally use feedforward correction, allowing a combination of feedback correction and feedforward correction based, at least in part, on a microphone signal generated by the microphone 26 in response to received acoustic energy. In a feedforward implementation, an additional microphone (not shown) may be used to detect noise external to the headphone, and provide a signal cancelling that noise. When both feedforward and feedback correction is used, the feedback microphone 26 detects the residual noise in the headphone cavity 24 after the feedforward system has functioned to cancel noise detected external to the headphone.

The current sensor 14 has a sensor input 34 to receive a signal proportional to the supply current Is from the power supply 20 and a sensor output 36 that provides a signal responsive to a characteristic (e.g., an amplitude and/or waveform or duration) of the supply current $I_s$. The signal conditioner module 16 includes an input 38 in communication with the output 36 of the current sensor 14 and an output 40 that provides a conditioned signal to the audio and mode control module 18. The conditioned signal is a logic level signal (e.g., a low or high logic value digital pulse) generated according to the signal provided at the sensor output 36. As illustrated, the current sensor 14 includes a "sensing" resistor 56 and an amplifier 58 having differential inputs to sense a voltage across the resistor 56.

The audio and mode control module 18 includes an input 42 to receive a signal from an audio source 44, another input 46 to receive the conditioned signal and an output 48 in communication with the first input 28 of the ANR module 12. The audio source for the headphone may be different than the audio source for a second headphone (not shown). For example, one audio source may provide a left channel audio signal and the other audio source may provide a right channel audio signal. The audio and mode control module 18 is used to control a mode of operation of the ANR audio system, an attribute of the audio input signal, or both, in response to the conditioned signal. Examples of modes include, but are not limited to, music playback, telephone mode, talk through mode (e.g., temporary pass through of a detected voice), a level of desired ANR, and audio source selection. Examples of attributes of the audio input signal include, but are not limited to, volume, balance, mute, pause, forward or reverse playback, playback speed, selection of an audio source, and talk through mode.

During typical operation, the audio output signal from the ANR module 12 is received at the speaker 22 and results in production of an acoustic signal that substantially reduces or eliminates acoustic noise within the headphone cavity 24. The audio output signal may also generate a desired acoustic signal (music or voice communications) within the headphone cavity 24.

Figure 2:
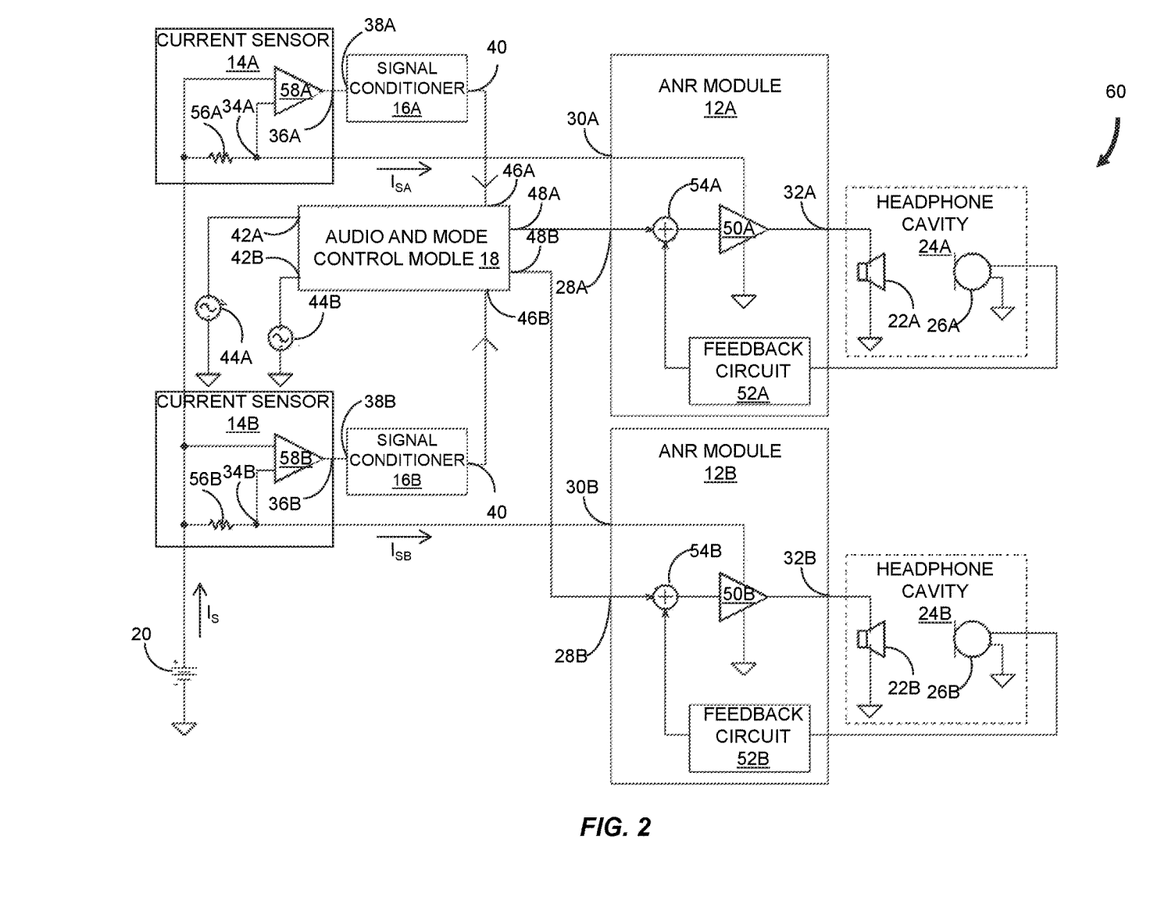
FIG. 2 is a functional block diagram of an example of circuitry for an ANR audio system having tap control.

ANR headphones generally operate in a manner to independently reduce acoustic noise in each headphone. Thus each ANR headphone includes all the components shown in FIG. 1 except for the audio and mode control module 18 and power supply 20 which may be "shared" with each headphone. FIG. 2 is a functional block diagram of an example of circuitry 60 that includes circuits for implementing ANR for a headphone system. The circuitry 60 includes two circuits that are similar to the circuit 10 of FIG. 1. Reference numbers in the figure that are followed by an "A" indicate elements associated with a circuit for one headphone (e.g., left headphone) and reference numbers followed by a "B" indicate elements associated with a circuit for the other headphone (e.g., right headphone). Reference numbers lacking an "A" or "B" are generally associated with shared circuit components, though in some examples, they may be provided individually in each headphone.

Figure 3:
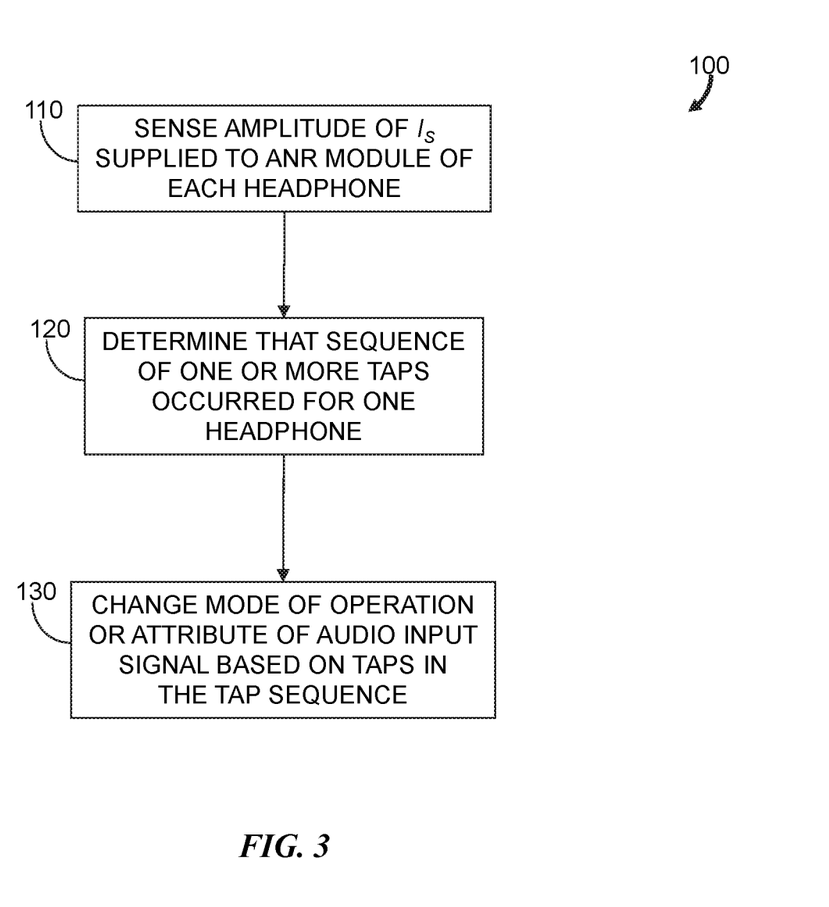
FIG. 3 is a flowchart representation of an example of a method for controlling an ANR audio system having tap control.

Reference is also made to FIG. 3 which shows a flowchart representation of an example of a method 100 for controlling an ANR audio system having tap control. During operation, the amplitude and/or waveform or duration of the supply current $I_s$ to each headphone is sensed (step 110) by monitoring the voltage drop across the sensing resistor 56. When an ear cup (or earbud) is tapped by a user or when the ear or region of the user's head near to the ear is tapped, the volume of the cavity defined by the ear cup and the user's ear canal changes due to the compliances of the cushion and user's skin. The result is a change in the pressure within the ear cup and ear canal, which is sensed by the microphone 26. The ANR module 12 responds by sending an electrical signal to the speaker 26 that produces an acoustic signal within the cavity intended to eliminate the pressure change caused by the tap. The electrical signal provided at the output 32 of the ANR module 12 is sourced from the amplifier 50 which in turn consumes the supply current $I_s$ from the power supply 20. Thus a tap applied by a user to the headphone can be recognized as a significant variation in the amplitude and/or waveform or duration of the supply current $I_s$.

The user may simply tap the headphone, ear or head a single time or may make multiple taps in rapid succession in order to change in a mode of operation of the ANR system or an attribute of the audio signal received from the audio sources 44. A determination is made (step 120) that a sequence of taps, including a single tap or multiple taps, has occurred. The mode of operation of the ANR system or an attribute of the audio input signal is changed (step 130) in response to the taps in the sequence. The steps of the method 100 are executed using the current sensor 14, signal conditioner module 16 and audio and control module 18. As each headphone has a current sensor 14 and a signal conditioner 16, either headphone or its associated ear or head region can be tapped to change the mode of operation or audio input signal attribute. Moreover, as described in more detail below, the simultaneous monitoring of the supply current $I_s$ for each headphone allows the determination according to step 120 to include a discrimination between a valid user tap and a different event that might otherwise be erroneously interpreted as a user tap. By way of example, a disturbance common to both headphones, such as dropping a headphone set, disconnecting the headphone set from an audio system or the occurrence of a loud "external acoustic event", may result in a determination that both headphones have been tapped by a user. If it appears that both headphones have been tapped at nearly the same time, the audio and mode control module 18 ignores the disturbance and the mode and audio signal attributes remain unchanged.

Figure 4:
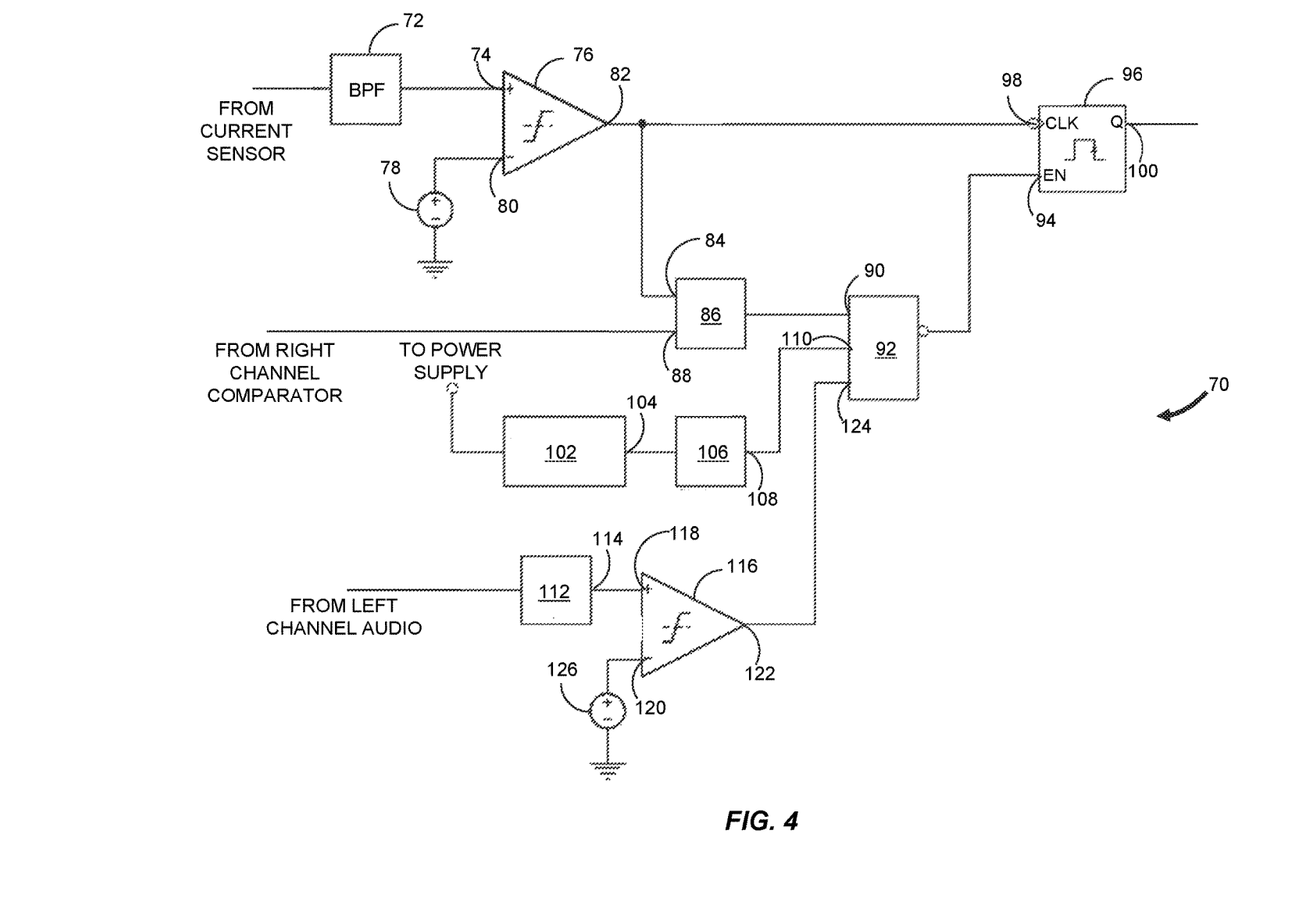
FIG. 4 is a functional block diagram of a circuit that may be used to implement one of the signal conditioner modules and the audio and mode control module of FIGS. 1 and 2.

Various circuit elements can be used to implement the modules present in the circuitry 60 of FIG. 2. For example, FIG. 4 shows a functional block diagram of a circuit 70 that may be used to implement the signal conditioner module 16A for the left headphone (similar circuitry could be used for the right headphone) and the audio and mode control module 18. Referring to FIG. 2 and FIG. 4, the circuit 70 includes a band-pass filter (BPF) 72, which filters the signal provided by the amplifier 58 in the current sensor 14. In other examples, the filter may be a low-pass filter. By way of one non-limiting example, the band-pass filter 72 can have a minimum pass frequency of approximately 1 Hz and, in another example, the band-pass filter 72 (or low-pass filter) can have a maximum pass frequency of approximately 50 Hz. In some examples, the band-pass filter 72 has a pass frequency of approximately 10 Hz. A non-zero minimum pass frequency prevents a near-DC event, such as a slow pressure application in which a headphone is slowly pressed against an object, such as a chair, from being interpreted as a tap event. The filtered signal is received at a first input 74 of a comparator 76 and a reference voltage source 78 is coupled to a second input 80 of the comparator 76. By way of example, the reference voltage source 78 can be a voltage divider resistive network coupled to a regulated power supply. A comparator output signal at the comparator output 82 is a logic value (e.g., HI) that indicates a possible tap event when the voltage at the first input 74 exceeds the "threshold voltage" applied to the second input 80 and otherwise is a complementary logic value (e.g., LO).

The comparator output signal, indicative of a possible tap event when at a logic HI value, is applied to a clock input 98 of a monostable vibrator 96. There can be occurrences when a signal of sufficient frequency and amplitude can cause excessive current through the current sensor 14 and therefore cause an affirmative signal at the comparator output 82 yet not result from a valid tap to a headphone. For example, a loud noise near a user might be sufficient to cause the comparator output signal to indicate a tap event. The circuit 70 provides further components to prevent invalid events from being interpreted as valid tap events. The comparator output signal is also applied to an input terminal 84 of an AND gate 86 and the comparator output signal from a counterpart comparator (e.g., right channel comparator, not shown) for the other (e.g., right) headphone channel is provided to the other input terminal 88. Thus the AND gate 86, which is applied to an input 90 of a NOR gate 92, produces a logic value (e.g., HI) if the comparator output signals for both the left and right headphone channels are logic HI. In turn, the NOR gage 92 inverts the logic HI signal to a logic LO signal that is applied to the enable input 94 of the monostable vibrator 96, thereby disabling the comparator output signal applied to the clock input 98 of the monostable vibrator 96 from appearing at the output 100. Thus, occurrences that would generate a change in pressure in both the left and right headphones that could be mistaken for a tap event (e.g., a loud noise near the user), are not interpreted as a tap event.

Another potential means for causing an erroneous determination of a tap event is a power supply transient event such as a powering on or powering off transient condition. A voltage detector 102 is in communication with the power supply and provides a logic signal (e.g., HI) at its output 104 indicating an excessive power supply voltage, that is, that the applied voltage has transitioned from less than a threshold voltage to greater than a threshold voltage. Conversely, the logic signal at the output 104 will change to a complementary logic value (e.g., LO) when the applied voltage transitions from greater than the threshold voltage to less than the threshold voltage. A delay module 106 receives the logic HI signal from the voltage detector 102 and holds the logic value until the expiration of a set time period (e.g., 0.5 s, though other periods of time could be used). This signal is applied to a second input 110 of the NOR gate 92 which in turn disables the monostable vibrator 96 to prevent a false indication of a tap event.

In addition, there can be unwanted transients in an audio channel of the headphone. For example, if a headphone jack is plugged into an audio device or if there is an electrostatic discharge occurrence, there may be a loud noise such as a "popping" or "crackling" due to an excessive peak voltage in the audio signal which, if not properly processed, may be sufficient to trigger a false indication of a tap event. An amplitude threshold module 112 receives the left channel audio signal and provides a delayed output signal at the output terminal 114 with a value corresponding to peaks in the voltage level of the audio signal. A comparator 116 receives the output signal from the delay module 112 at a first input terminal 118 and a voltage from a reference voltage source 126 is applied to a second input terminal 120. The reference voltage is selected to correspond to a voltage value above which the delayed output signal is considered to indicate an audio occurrence that is not a valid tap event. Thus, if the signal at the first input terminal 118 exceeds the signal at the second input terminal 120, a logic HI signal is generated at the comparator output 122 and applied to an input 124 of the NOR gate 92. As a result, the NOR gate 92 applies a logic LO signal to the enable input 94 of the monostable vibrator 96 to disable the comparator output signal at the clock input 98 of the monostable vibrator 96 from appearing at the output 100.

In the detection of error conditions described above, the NOR gate 92 is a logic element that includes a number of inputs with each input receiving a logic signal indicative of a particular error condition. The output of the logic element provides a logic signal having a first state if at least one of the error conditions exists and a second state if none of the error conditions exist. The logic signal at the output is used to prevent a determination of a tap event for circumstances unrelated to a tap event. Thus the circuit 70 described above provides for determining the states of various error conditions, that is, conditions that can lead to a determination of a tap event without a user actually tapping a headphone. The circuit 70 prevents such conditions from causing a change in an audio attribute or operational mode of ANR headphones or an ANR audio system.

In one alternative configuration, the comparator 76 is implemented instead as a discriminator that uses two thresholds instead of a single threshold to determine a valid tap event. The two thresholds may be selected so that the filtered signal from the bandpass filter 72 is interpreted to indicate a valid tap event if the voltage exceeds a lower threshold voltage and does not exceed the higher threshold voltage. In this way extreme amplitude events that "pass" the lower threshold voltage requirement, but are not initiated by a user tap, are prevented from being interpreted as valid tap event. By way of one example, removing a single headphone from the head of a user may result in such a high amplitude event.

In the various examples described above, the threshold value or values (e.g., voltage value(s)) used to determine a valid tap event are constant values generally defined to be greater than a typical background noise value. Users may tap their headphone, ear or head differently from each other to cause different amplitude pressure changes. Consequently, a threshold value established for all users may not be suitable for users that tap substantially "harder" or "softer" than a typical user. For example, a user that taps "harder" than the typical user will generate greater amplitude pressure pulses. Referring to FIG. 4, the voltage pulses at the first input 74 of the comparator 76 corresponding to these harder taps have greater peak amplitudes than voltage pulses for a typical user. For a user that typically uses hard taps, it may be beneficial to use a greater threshold voltage for a more robust detection of valid tap events. Conversely, for a user that taps "softer" than the typical user, it may be beneficial to use a lesser threshold voltage to avoid missing any tap events as long at the difference between the lesser threshold voltage and the voltage attributable to the background noise, including background noise peaks, is sufficient to prevent declaring unintended tap events. A lesser threshold voltage may be preferable when the ear canal is repeatedly not well sealed by the headphone, for example, due to the way a user dons the headphone (e.g., obstructions due to hair).

Figure 5:
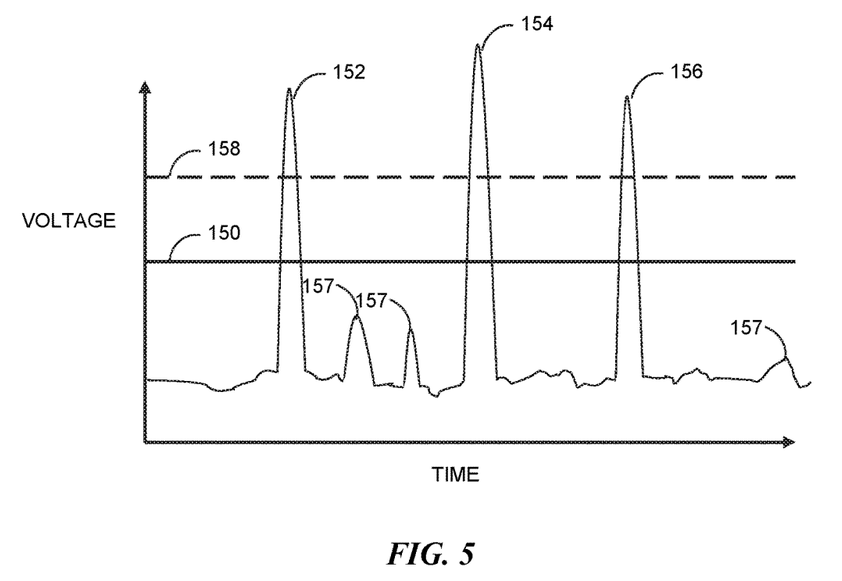
FIG. 5 is an example of voltage peaks associated with pressure pulses for taps used to control an audio system.

FIG. 5 graphically depicts an example of the voltage at the first input 74 of the comparator 76 as a function of time for a user that implements control using hard taps. In this example, voltage pulses 152, 154 and 156 corresponding to three consecutive valid tap events are shown with each tap event including only one tap. Other voltage pulses 157 may be present due to mechanical disturbances in the user's environment; however, such voltage pulses 157 are typically well below the amplitude of those corresponding to valid tap events. A default threshold voltage is shown by solid line 150. It should be noted that the peak voltage for each tap event is substantially greater than the default threshold voltage. The default threshold voltage value may be defined by a ratio of a typical peak voltage for a typical user to an expected noise level for the typical user. In the method 200 described below, an adaptive threshold (dashed line 158) is determined at a greater voltage so that the headphone is more immune to false detections by noise peaks while not sacrificing the ability to detect valid tap events.

Figure 6:
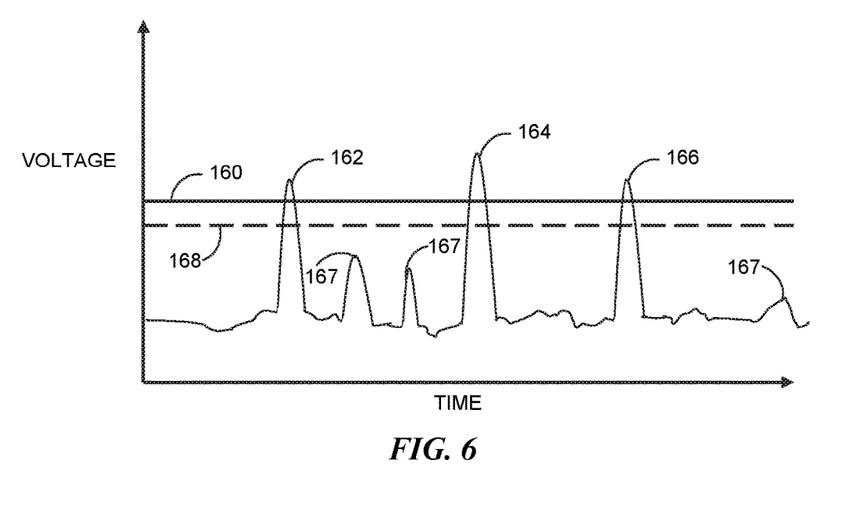
FIG. 6 is another example of voltage peaks associated with pressure pulses for taps used to control an audio system.

FIG. 6 graphically depicts an alternative example of the voltage at the first input 74 of the comparator 76 as a function of time for a user that implements control using soft taps. In this example, pressure pulses 162, 164 and 166 corresponding to three valid tap events are shown. The default threshold voltage is shown by solid line 160. The peak voltages for the three tap events are not substantially greater than the default threshold voltage (solid line 160). An adaptive threshold (dashed line 168), which may be derived from long term averaging of the power supply current, can be determined so that valid tap events initiated by the user are more likely to be detected while not substantially degrading immunity to false detections caused by noise peaks 167.

Figure 7:
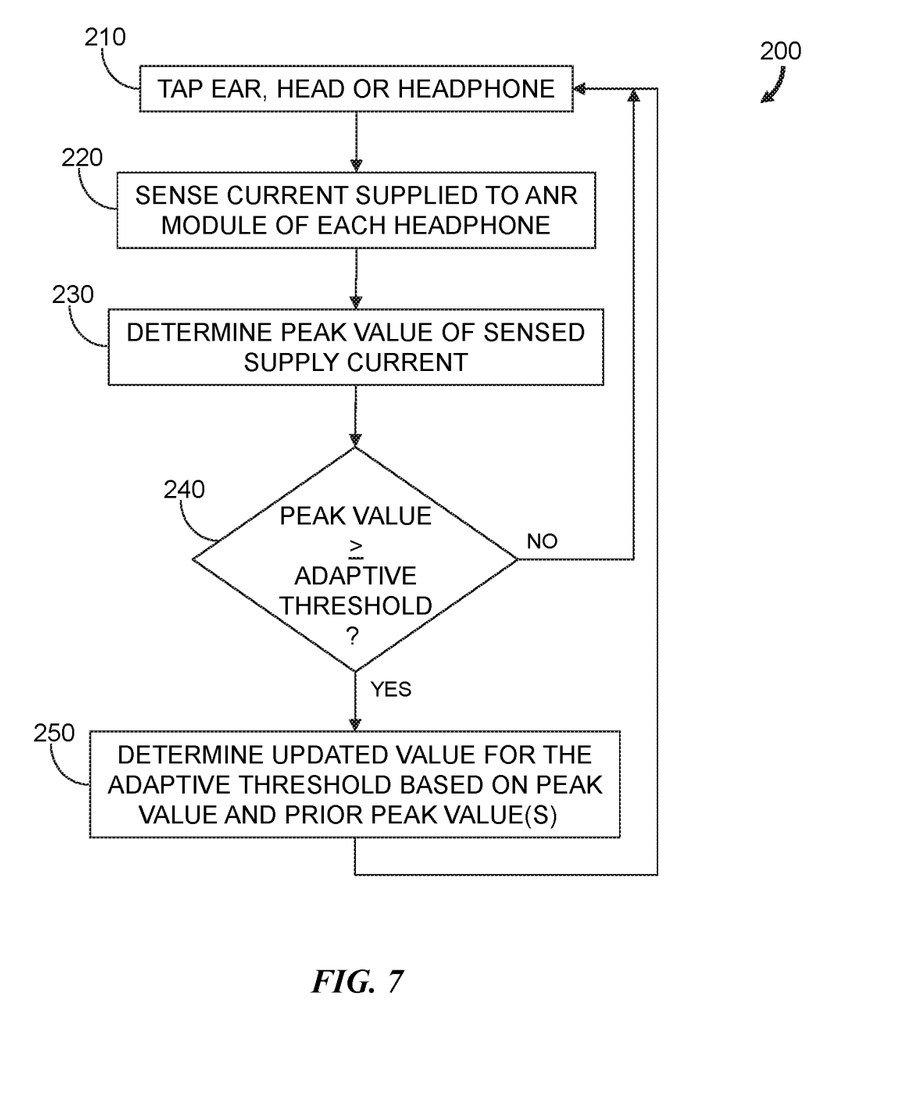
FIG. 7 is a flowchart representation of an example of a method for controlling an audio system using taps.

FIG. 7 is a flowchart representation of an example of a method 200 for controlling an audio system. The example includes tapping (step 210) an ANR headphone, or the ear or head of the user, to cause an acoustic pressure change in the user's ear canal. The current supplied to an ANR module of the headphone is responsive to the pressure change in the ear canal. The current is sensed (step 220), for example, by monitoring the voltage of a current sensor. A peak value of the sensed current is determined (step 230) and compared (step 240) to a value (e.g., a voltage value) of an adaptive threshold to determine if a valid tap event occurred. In some implementations, the peak value may be a voltage value provided by a current sensor. The adaptive threshold value is set at a predetermined initial value at the beginning of a use session when power is first applied. If the peak value is determined (step 240) to be less than the adaptive threshold value, the method 200 returns to step 210 for continued monitoring for tap events. Conversely, if it is determined (step 240) that the peak value equals or exceeds the adaptive threshold value, an updated value for the adaptive threshold is determined (step 250) based on the peak value and any prior peak values determined to correspond to tap events. For example, the updated value for the adaptive threshold value may be a product of a predetermined constant (e.g., a percentage) of an average of all peak values for tap events determined during the user session. In alternative examples, the updated value for the adaptive threshold may be determined according to weighting the values for more recent tap events more heavily than older tap events, according to a statistical distribution of the peak values or according to other criteria applied to the peak values to achieve an updated adaptive threshold value for robust detection of tap events. After updating the value for the adaptive threshold, the method 200 returns to step 210 to continue monitoring for tap events.

The determination of the peak value of the sensed supply current, the comparison of the peak value to the adaptive threshold and the determination of the updated value for the adaptive threshold, as performed in steps 220, 230 and 240, may be executed by one or more processors in communication with the microphone 24 inside the headphone cavity 24 and the ANR module 12 (see FIG. 1). In one example, the processor(s) may also be shared with the audio and mode control module 18.

As described above, the adaptive threshold value is set to a predetermined initial value that is used at the beginning of each user session. Thus, if the acoustic sealing of the ear canal is different for different user sessions, each user session results in an adaptive threshold determination that is responsive to the acoustic seal for that session. In an alternative example, the method 200 may be implemented such that the last adaptive threshold value from the prior user session is used as the initial adaptive threshold value for the new session, thereby allowing the adaptive threshold value to more rapidly converge on an appropriate value as long as the acoustic sealing of the user ear canal is substantially consistent over the user sessions.

In the examples of soft tapping described above, the ear canal is acoustically sealed from the external environment by the headphone. In the case in which the ear canal is not well sealed by the headphone, the peak values for the user taps will be reduced; however, the noise level is typically also reduced in a substantially proportionate manner. Consequently, adjustment of the threshold value in this instance may not provide a useful benefit.

In some situations a user may unintentionally cause a tap event, for example, by moving the user's hair or by adjusting eye glasses. The pressure pulses generated by such activities may result in a tap event being determined ("declared"). Double tap controls can be used to prevent the audio system from interpreting these activities as tap events, resulting in a robust immunity to false tap event declarations. For example, a double tap event can be detected from a double-tapping of a headphone, ear or head of the user. A double tap event is defined as two taps detected in a time window that starts upon detection of the first tap and ends after a fixed duration (e.g., 500 ms). Thus, a single tap that is not followed by another tap during the time window of fixed duration will not be interpreted as a double tap event. In addition, if two or more additional taps occur during the time window initiated by an earlier tap (for a total of three taps), a tap event is not declared.

Figure 8A:
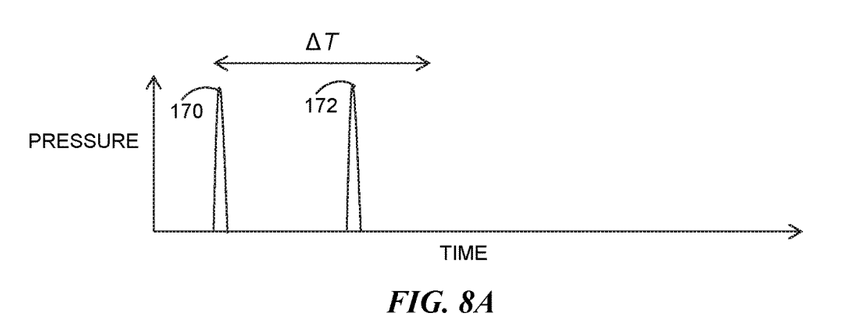
FIGS. 8A, 8B and 8C are depictions of pressure pulses associated with taps that may be used to control an audio system having tap control.

FIG. 8A depicts an example of two taps for a valid double tap event as determined in accordance with an example of the method 200. The first tap 170 starts a time window of duration $\Delta T$. The second tap 172 occurs before the expiration of the time window and without any other taps present in the time window. Consequently, a double tap event is declared.

Figure 8B:
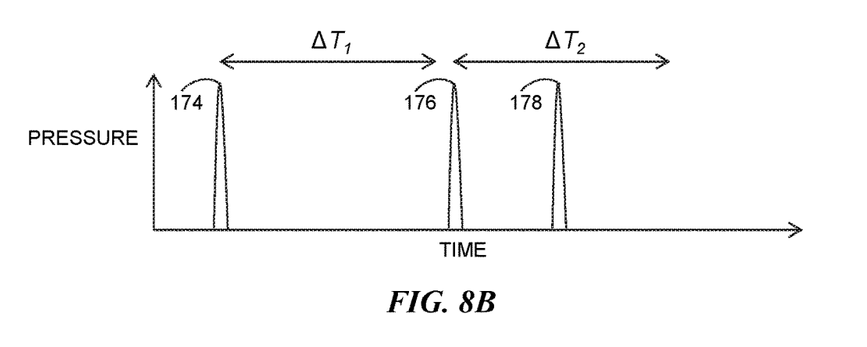

FIG. 8B depicts another example in which a first tap 174 starts a first time window of duration $\Delta T_1$. No taps are detected during the time window therefore no double tap event is declared. A second tap 176 occurring after expiration of the first time window starts a second time window of duration $\Delta T_2$. A third tap 178 occurs during the second time window without any additional taps during the second time window; therefore the second and third taps 176 and 178 are interpreted as a valid double tap event.

Figure 8C:
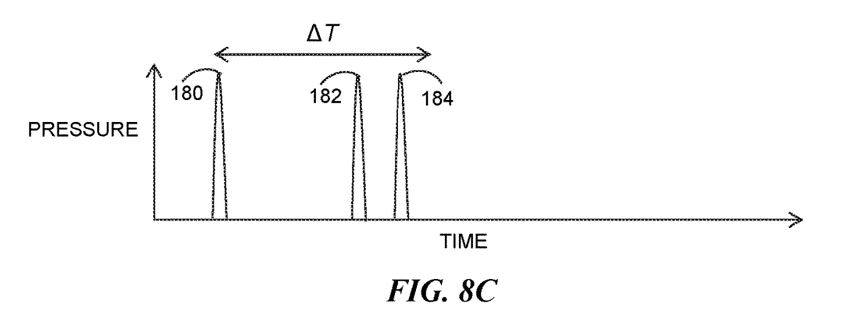

FIG. 8C depicts another example in which a first tap 180 starts a time window of duration ΔT during which two additional taps 182 and 184 occur. Consequently, a double tap event is not declared.

Figure 9:
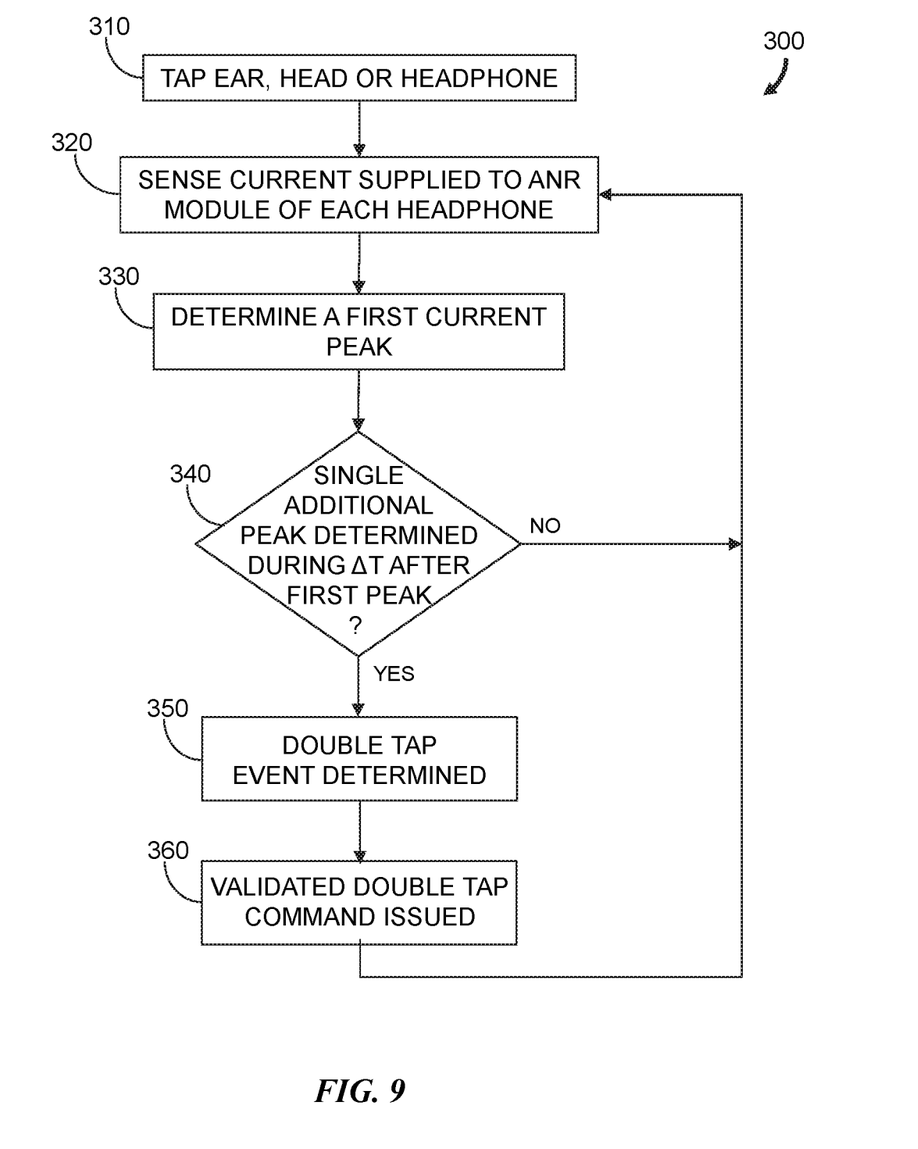
FIG. 9 is a flowchart representation of another example of a method for controlling an audio system using taps.

FIG. 9 is a flowchart representation of an example of a method 300 for controlling an audio system. The example includes tapping (step 310) a headphone, or the ear or head of a user, to cause an acoustic pressure change in the ear canal of the user. The current supplied to the ANR module of the headphone is responsive to the pressure change in the ear canal due to the tapping. The current is sensed (step 320) by monitoring the voltage of a current sensor or by other means for sensing current as is known in the art. A first current peak is determined (step 330) and, in response to the determination, a time window of fixed duration is initiated. If it is determined (step 340) that a single additional peak occurs during the time window, a dual tap event is determined, or declared (step 350). In some implementations, the determination of step 350 is delayed until the expiration of the fixed duration to allow for detection of at least a third peak that may occur during the time window which may prevent a declaration of a double tap event. Once the double tap event is determined, a validated double tap command is issued (step 360) and the method returns to step 320.

In some instances, ear buds or ear cups may be powered before they are inserted into the ear canals or over the ears, respectively. This situation increases the probability that during insertion and/or adjustment of the ear buds or ear cups, there may be two or more taps within a time window. Such a situation may be problematic for certain uses. For example, an aviator may use an audio system which provides "talk through" capability for one headphone. The aviator may unknowingly change to talk through mode in this situation which can result in the aviator hearing unwanted nearby conversations. To address this situation, a second window of longer duration (e.g., two or more seconds) may be used to implement a period during which all double tap events are ignored. In one alternative, a second double tap event determined during the second window may be used to revert the audio system to the previous mode and to ignore all further double tap events for the remainder of the second window.

The application of the second, longer duration window may vary according to the awareness of the audio system to its operating mode. As described above, if a double tap event is used to initiate the talk through mode, it may be preferable to maintain a second window duration of a few seconds. Conversely, when power is initially provided to the headphones, it can be preferable to use a second window duration that is substantially greater (e.g., 30 seconds). This longer duration can accommodate the user's actions in donning the headphones and making initial positional adjustments to the headphones. In yet another example, if the audio system is configured for music playback (e.g., configured via an active Bluetooth interface), a shorter duration for the second window (e.g., 2 seconds) may be applied.

The circuitry of FIGS. 1, 2 and 4 may be implemented with discrete electronics, by software code running on a digital signal processor (DSP) or any other suitable processor within or in communication with the headphone or headphones.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A method for controlling an audio system, the method comprising:
   tapping at least one of a headphone worn by a user and an ear or a head of the user to cause an acoustic pressure change in an ear canal of the user, the ear canal being substantially sealed by an acoustic noise reduction (ANR) headphone having an ANR module;
   sensing a current provided to the ANR module, the current being responsive to a pressure change in the ear canal;
   determining a peak value from the sensed current;
   comparing the peak value and a value of an adaptive threshold to determine if a tap occurred; and
   if the tap is determined to have occurred, determining an updated value for the adaptive threshold based on the peak value and one or more prior peak values.

2. The method of claim 1 further comprising changing at least one of a mode of operation of the audio system and an attribute of an audio input signal in response to a determination that the tap occurred.

3. The method of claim 1 wherein the updated value of the adaptive threshold is determined as a product of a predetermined constant and an average of the peak value and the one or more prior peak values.

4. The method of claim 1 wherein the one or more prior peak values occur during a current user session.

5. The method of claim 1 wherein at least one of the one or more peak values occurs during a prior user session.

6. The method of claim 3 wherein the value and the updated value of the adaptive threshold are greater than an average noise level and less than an average of the peak value and the one or more prior peak values.

7. The method of claim 1 wherein the sensing of the current provided to the ANR module comprises sensing a voltage of a current sensor.

8. The method of claim 1 wherein the updated value of the adaptive threshold is greater than the value of the adaptive threshold if the peak value is greater than the value of the adaptive threshold.

9. The method of claim 1 wherein the updated value of the adaptive threshold is less than the value of the adaptive threshold if the peak value is less than the value of the adaptive threshold.

10. The method of claim 1 wherein the headphone comprises an ear cup.

11. The method of claim 1 wherein the headphone comprises an earbud.

12. A headphone comprising:
a microphone for detecting a pressure change in a substantially sealed cavity of the headphone, the cavity comprising an ear canal of a wearer of the headphone;
an acoustic noise reduction (ANR) module coupled to the microphone for generating a noise cancellation signal to cancel noise detected by the microphone; and
a processor in communication with the microphone and the ANR module, the processor configured to:
sense a current provided to the ANR module, the current being responsive to a pressure change in the ear canal;
determine a peak value from the sensed current;
compare the peak value and a value of an adaptive threshold to determine if a tap occurred; and
if the tap is determined to have occurred, determine an updated value for the adaptive threshold based on the peak value and one or more prior peak values.

13. The headphone of claim 12 wherein the processor is further configured to change at least one of a mode of operation of the audio system and an attribute of an audio input signal in response to a determination that the tap occurred.

14. The headphone of claim 12 wherein the determination of the updated value for the adaptive threshold comprises determining a product of a predetermined constant and an average of the peak value and the one or more prior peak values.

15. The headphone of claim 12 further comprising a current sensor in communication with the ANR module and the processor, and configured to provide a signal responsive to a characteristic of the current.

* * * * *